United States Patent
De Villeroche et al.

[19]

[11] Patent Number: 5,805,047
[45] Date of Patent: Sep. 8, 1998

[54] FUSED CAR BATTERY TERMINAL AND FUSE-LINK THEREFOR

[75] Inventors: Françis Jodon De Villeroche, Paris; Alain Bednarek, Neuilly en Vexin; Jean-Pierre Picaud, Eaubonne; Patrick Mansutti, Pont Sainte Maxence; Stéphane Kugener, Paris, all of France

[73] Assignee: The Whitaker Corporation, Wilmington, Del.

[21] Appl. No.: 521,678

[22] Filed: Aug. 31, 1995

[51] Int. Cl.⁶ .................................................. H01H 85/04
[52] U.S. Cl. .............................. 337/290; 337/5; 337/295; 337/142
[58] Field of Search ................................ 337/161, 295, 337/297, 159, 160–5, 142, 290

[56] References Cited

U.S. PATENT DOCUMENTS

| Re. 18,128 | 7/1931 | Glowacki | 337/161 |
|---|---|---|---|
| 2,055,866 | 9/1936 | Jung et al. | 200/135 |
| 2,376,809 | 5/1945 | Rawlins | 337/161 |
| 2,502,747 | 4/1950 | Popp et al. | 200/135 |
| 2,561,464 | 7/1951 | Cremer | 337/161 |
| 2,727,110 | 12/1955 | von Hoorn | 200/117 |
| 2,773,961 | 12/1956 | Sundt | 337/295 |
| 2,794,097 | 9/1957 | Jacobs | 200/120 |
| 3,140,371 | 7/1964 | Johann et al. | 200/135 |
| 3,524,157 | 8/1970 | Salzer | 337/159 |
| 4,635,023 | 1/1987 | Oh | 337/163 |
| 4,751,490 | 6/1988 | Hatagishi | 337/295 |
| 4,782,240 | 11/1988 | Davidson | 307/10 |
| 5,034,620 | 7/1991 | Cameron | 307/10.7 |
| 5,120,617 | 6/1992 | Cameron | 429/7 |
| 5,200,877 | 4/1993 | Betton | 361/92 |
| 5,229,739 | 7/1993 | Oh et al. | 337/290 |
| 5,546,066 | 8/1996 | Kondo | 337/163 |

FOREIGN PATENT DOCUMENTS

| 0 145 192 | 6/1985 | European Pat. Off. | H01H 85/04 |
|---|---|---|---|
| 2 096 655 | 2/1972 | France | H01H 35/00 |
| 549578 | 6/1942 | United Kingdom . | |
| WO 88/01790 | 3/1988 | WIPO | H01H 85/00 |

OTHER PUBLICATIONS

European Search Report.

*Primary Examiner*—Leo P. Picard
*Assistant Examiner*—Jayprakash N. Gandhi
*Attorney, Agent, or Firm*—Bradley N. Ditty

[57] ABSTRACT

A fused battery terminal has a stamped and formed terminal member an insulative housing integrally molded over power supply line connection bolts, and a battery post mounting member attached to the terminal member. The terminal member is rigidly attached to the insulative support member thereby providing a safe and rigid support for a fuse link which is integral with the terminal member. Power supply lines can thus be clamped against connection platforms of the terminal member by the bolt and are thus directly connected to the battery post via the fuse link. Safety and reliability of the fuse connection between the battery and power supply line are thus enhanced due to the integral forming of the fuse line onto the battery post connection section.

23 Claims, 10 Drawing Sheets

FUSED CAR BATTERY TERMINAL AND FUSE-LINK THEREFOR

BACKGROUND OF THE INVENTION

1. Field of the Invention

This invention relates to an automotive fuse-link and to a battery terminal incorporating a fuse-link.

2. Description of the Prior Art

There is a demand in the automobile industry to provide fuses in the power supply lines connected to a battery. The fuses must support considerable electrical currents prior to blowing, as nominal car power needs may be in excess of 100 amperes. Due to the extremely high currents, a poor contact between the fuse and the supply line interconnects to the battery, may generate high temperatures for a long period that could be a cause of a fire. There is therefore a need to ensure that the fuse interconnecting the power supply and battery is properly connected thereto. In the prior art, however, such fuses are separate parts that are connected by bolts on one end to the power supply line and on the other end to the line leading to the battery terminal. Insufficient torque of the connection bolts, or loosening thereof, has caused fires in certain instances.

The performance requirements of a fuse for use with a battery terminal are very difficult to meet because, for example, the fuse should blow at 600 amperes within less than a second, but withstand start motor current peaks of 300–400 amperes for up to ten seconds whilst nevertheless blowing at 150 amperes over extended times. Furthermore, all these characteristics must remain substantially constant over the specified lifetime of the vehicle. There is therefore a need to provide a high current fuse-link that can be easily "tuned" to match the desired operating specifications in a reliable but cost-effective manner. Other high current fuse applications could of course also be subject to the same problems and benefit from the same solutions to those problems.

It is also desirable to provide a cost-effective and reliable battery terminal fuse that allows simple and safe connection of power supply lines directly thereto.

SUMMARY OF THE INVENTION

It is therefore an object of this invention to provide a fused battery terminal allowing simple and safe interconnection of power lines to an automobile battery.

It is a further object of this invention to provide a cost-effective, reliable fused connector assembly for an automobile battery terminal.

It is an object of this invention to provide a fuse-link for high current applications that can be easily tuned for adjustment to satisfy complex operating specifications such that the fuse-link functions reliably over its specified lifetime.

Objects of this invention have been achieved by providing a fuse assembly for interconnecting power supply lines to an automobile battery, the fuse assembly having a stamped and formed sheet metal terminal comprising a supply line interconnection portion and a battery terminal portion connected via a fuse link that is blowable when subjected to sufficiently high electrical current, whereby the battery portion comprises an integral battery post connection portion insertable over a battery post of an automobile battery for electrical connection thereto.

Other objects of this invention have been achieved by providing a fuse-link comprising a first high temperature conductive base member and a second high temperature conductive base member, each of the base members having a support bar to which a fusible material is attached and interlink the support bars of the first and second base members. The fusible material has a lower temperature melting point than the high temperature material such that it melts and falls off the support bars when excessive electrical current flows therethrough, thereby breaking the electrical connection between the first and second base members. The support bars are substantially interlinked only by the fusible material which could be made of tin, or tin alloy. The support part can advantageously be attached to the base members via a reduced width section that can be adjusted in width and length for mainly varying the heat transfer from the support bar to the base members in order to control the fuse-blowing characteristics.

A preferred embodiment of this invention also comprises an insulative support platform to which the power supply and battery portions of the terminal plate are securely fixed, whereby threaded mounting bolts are securely attached to the support member, for example inmoulded, to allow secure tightening of the power supply lines against the fuse terminal and power supply portions.

DETAILED DESCRIPTION OF THE PREFERRED EMBODIMENT

Referring first to FIGS. 1–5, a fused battery terminal 2 is shown comprising a support member 4, a stamped and formed electrical terminal member 6 and battery post mounting members 8. The battery post mounting member 8 has a rotatable cap 10 that cooperates with conical jaws for clamping onto a battery post of an automobile battery. The mounting member is a known design and is not explained here in any detail. The terminal member 6 could be interconnected to the battery post by any other mounting means.

Figure 15:
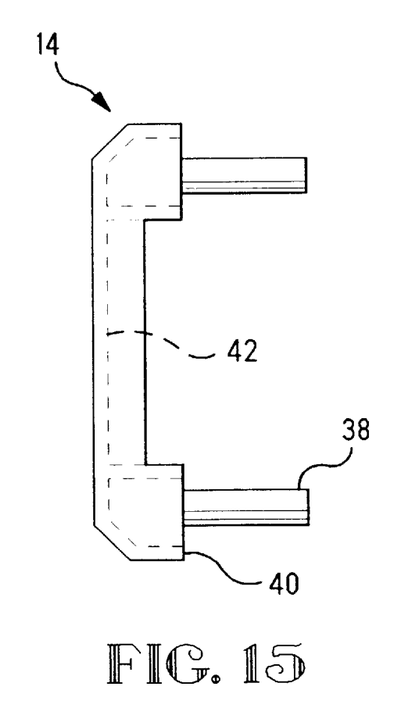
FIGS. 15 and 16 are side and bottom views respectively of an insulative cover member for mounting to the support member.
Figure 16:
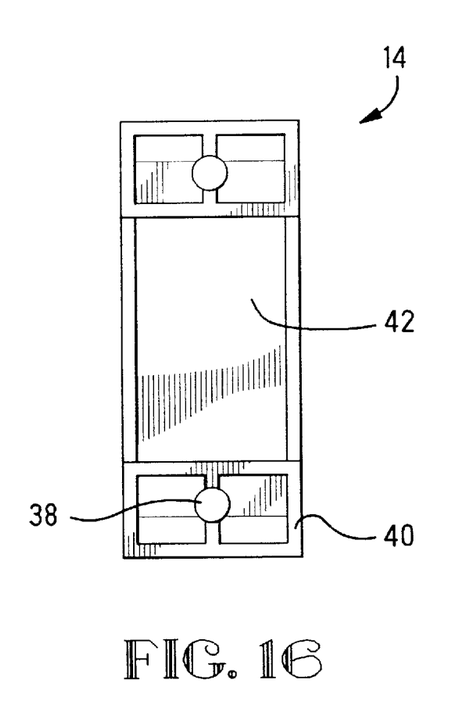

Referring now to FIGS. 9–12, the support member 4 will be explained in more detail. The support member 4 comprises an insulative molded housing 12, an insulative fuse cover 14 (see FIGS. 15 and 16), and power and safety supply bolts 18, 16 having head portions 20 inmoulded to the insulative housing 12. The support member 4 has a first power supply section 22 and a second battery terminal section 24 separated by a fuse section 25 extending therebetween. The power supply connection bolt 18 is inmoulded to the first section 22 and the other safety power supply bolt 16 is inmoulded to the second section 24. Both first and second section 22, 25 comprise pairs of retaining walls 26 extending outwardly from opposing side surfaces 28, 30 of the housing 12. The fuse section 25 has an upper surface 32 which is recessed with respect to the upper surface 34 of sections 22, 24. The fuse section 26 further comprises a pair of mounting cavities 36 for receiving pins 36 of the cover 14 (see FIGS. 15 and 16) for mounting of the cover thereto. The cover 14 has mounting surfaces 40 surrounding the base of the mounting pins 38 and a fuse cover surface 42 which is recessed with respect to the surfaces 40.

Figure 13:
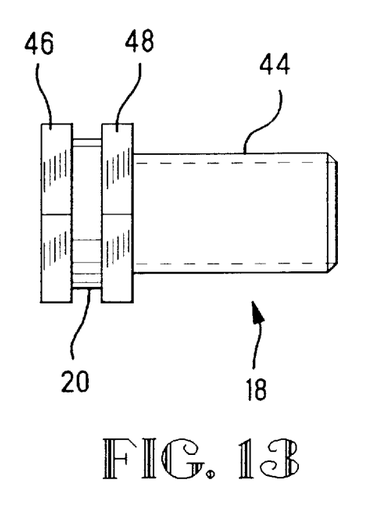
FIGS. 13 and 14 are side and top views of a bolt member 4 for inmoulding in the support member.
Figure 14:
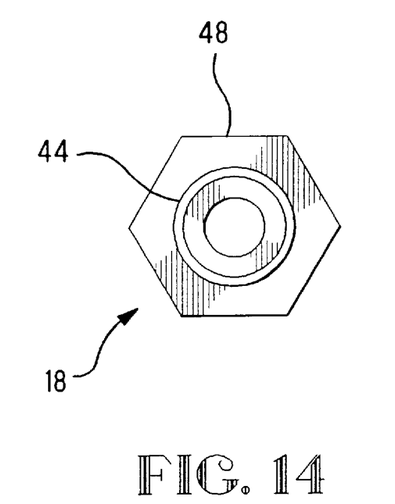

Referring to FIGS. 13 and 14, the bolt 18 is shown comprising a threaded portion 44 and the head portion 20 which has a cylindrical anchoring portion 46 for supporting the bolt within the overmoulded housing 12, and a hexagonal extension 48 for preventing rotation of the bolt within the housing. The bolt 16 has a smaller diameter than the bolt 18 but has a head of a similar construction to that of the bolt 18.

Figure 1:
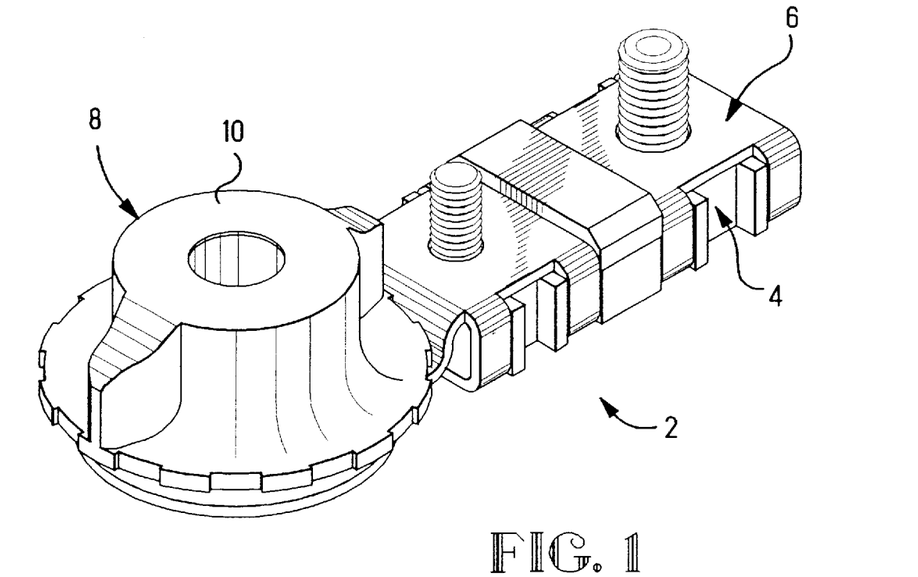
FIG. 1 is an isometric view of a fused battery terminal.
Figure 2:
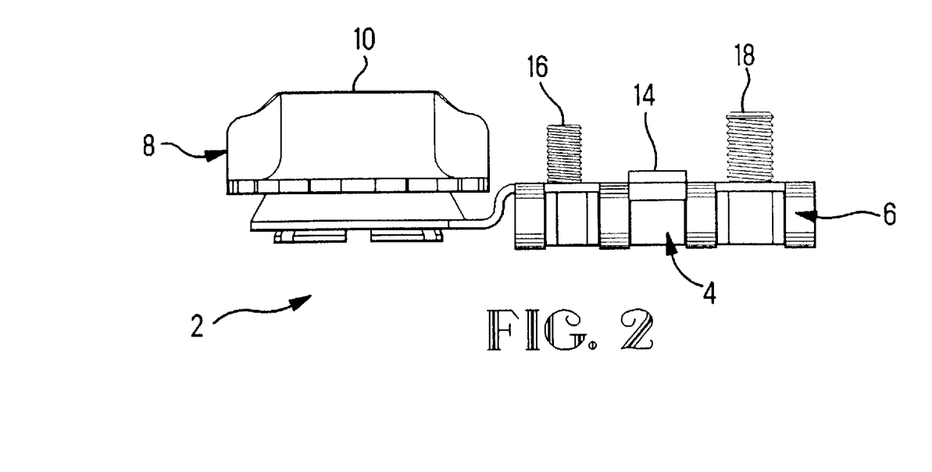
FIG. 2 is a side view of the terminal of FIG. 1.
Figure 3:
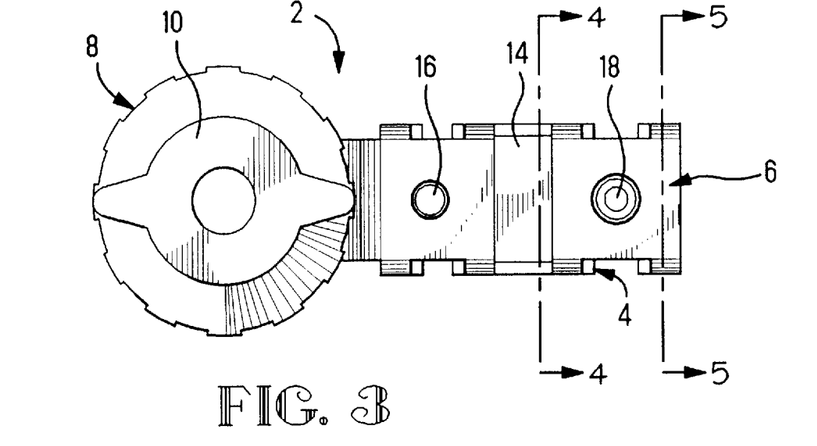
FIG. 3 is a top view of the terminal of FIG. 2.
Figure 4:
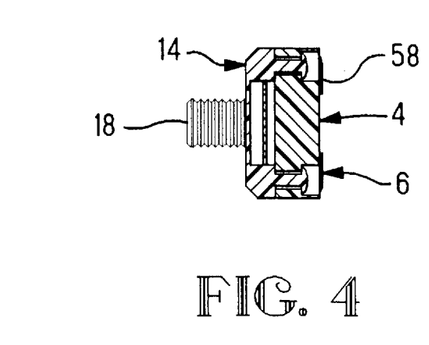
FIG. 4 is a cross-sectional view through lines 4—4 of FIG. 3.
Figure 5:
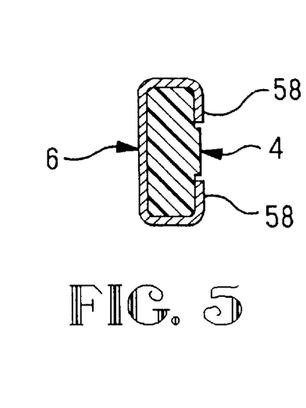
FIG. 5 is a cross-sectional view through lines 5—5 of FIG. 3.
Figure 6:
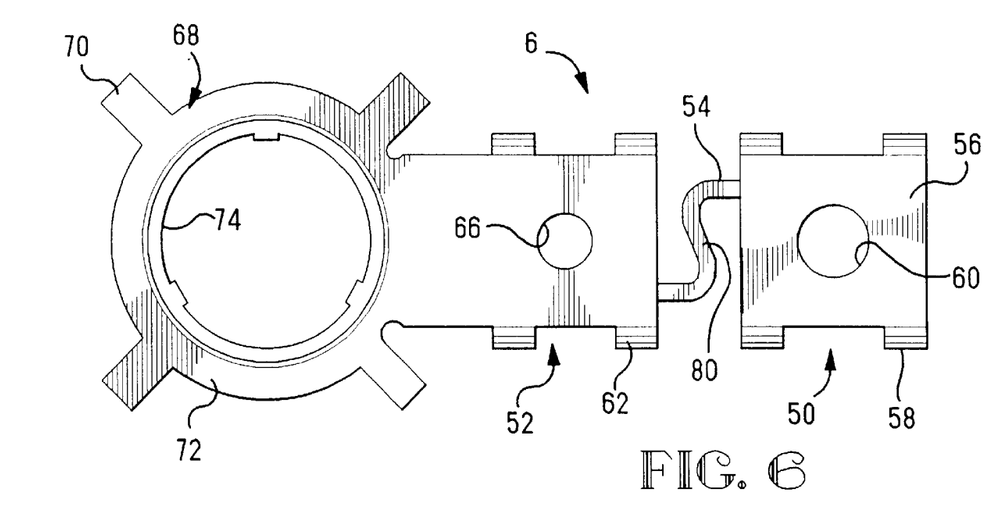
FIG. 6 is a top view of a stamped and formed base plate.
Figure 7:
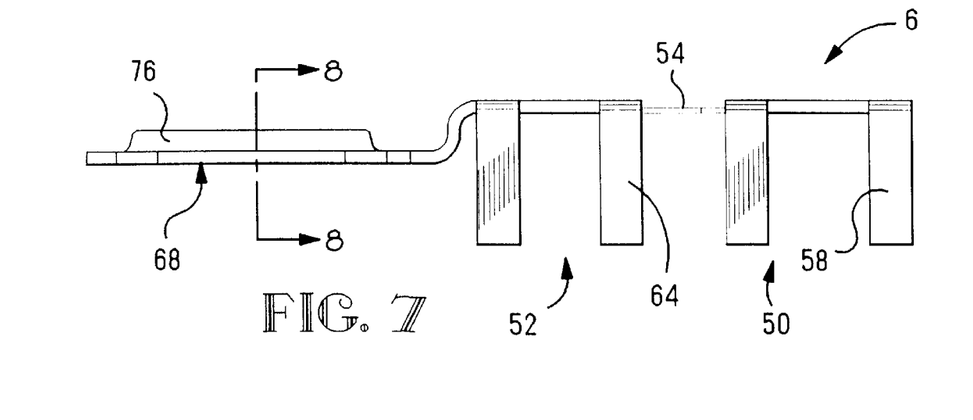
FIG. 7 is a side view of the base plate of FIG. 6.
Figure 8:
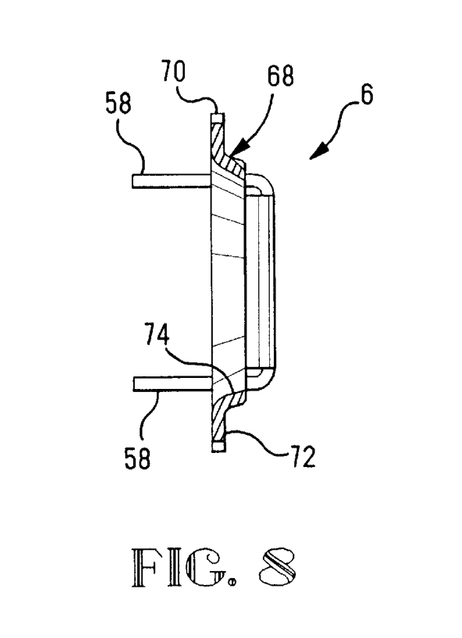
FIG. 8 is a cross-sectional view through lines 8—8 of FIG. 7.
Figure 9:
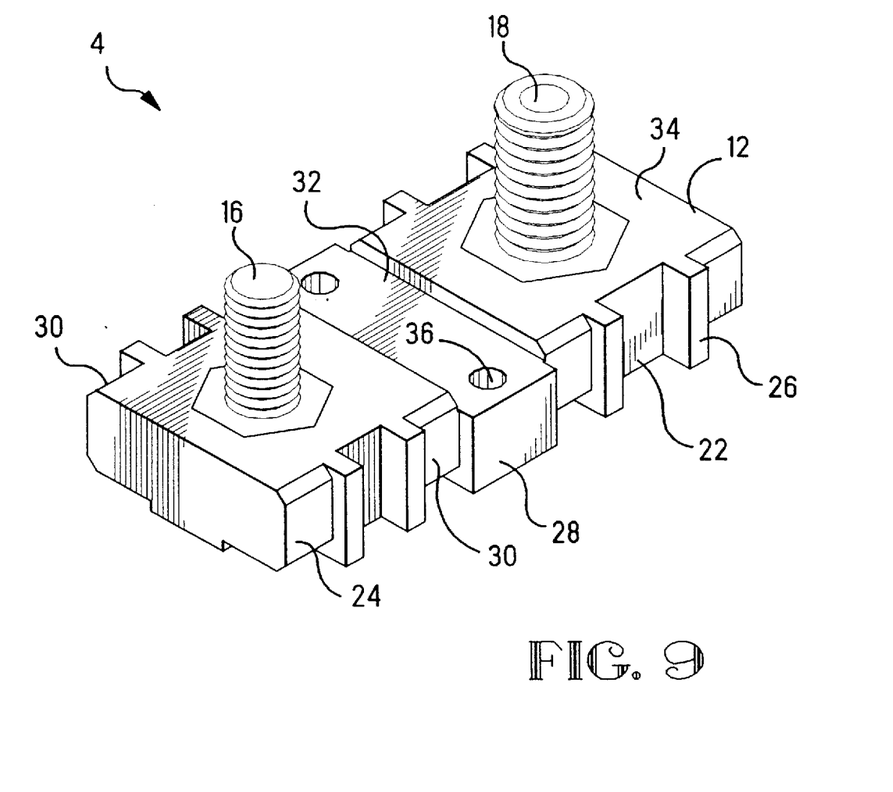
FIG. 9 is an isometric view of a support member.
Figure 10:
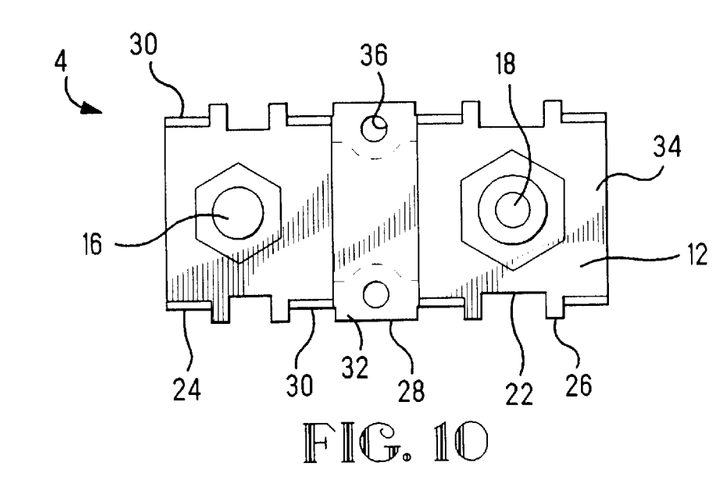
FIG. 10 is a top view of the support member.
Figure 11:
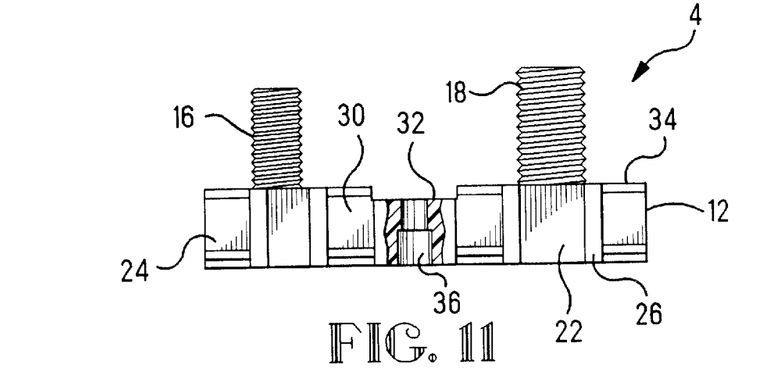
FIG. 11 is a partial cross-sectional side view of the support member.
Figure 12:
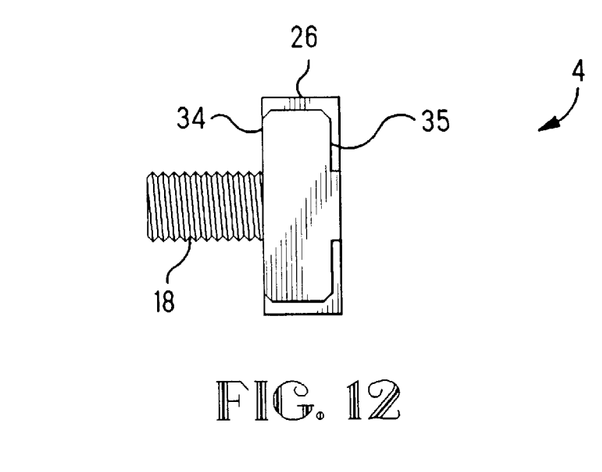
FIG. 12 is an end view of the support member.

Referring now to FIGS. 6–8, the terminal member 6 is shown having a first section 50 and a second section 52 separated by a fuse link 54. The first terminal section 50 comprises a connection platform 56 from which extend four mounting tabs 58, the connection platform 56 comprising a hole 60 for receiving the bolt 18 therethrough. The second terminal section 52 similarly comprises a connection platform 62 from which extend mounting tabs 64, the connection platform 62 also comprising a hole 66 for receiving the bolt 16 therethrough. The second terminal section 52 is integrally attached to a battery post connection section 68 to which the battery post mounting member 8 is mechanically and electrically connected. The connection section 58 comprises mounting member fixing tabs 70 extending outwardly from a circular base portion 72, the base portion having a circular cutout 74 for mounting over and around the battery post. The cutout 74 is bounded by a truncated conical section 76 that extends upwards from the base section 72.

The fuse link 54 is coined such that it has a material thickness thinner than the sheet metal from which the terminal member 6 is stamped and formed (as best shown in FIG. 7), the fuse link having a thin central section 80 which is the point of highest resistance thereby melting and breaking the electrical circuit when subjected to excessive electrical current.

Referring to FIGS. 1–5, the terminal member 6 is shown mounted to the support member 4 whereby the mounting arms 58 are wrapped around the sides 24, 30 of the housing 12 and are retained from forward and rearward movement by retaining walls 26 which help to strengthen and protect the tabs from damage once wrapped around the housing 12.

The fuse cover 14 is then mounted to the housing 12, and the pins 38 are bonded to the holes 36 by an ultrasonic welding process such that the fuse link 54 is protected from damage and deposits of material from the environment that may alter it's fuse blowing characteristics. The housing and cover recesses 32, 42 allow a sufficient gap to the fuse link such that during the melting process the fuse link does not sag and enter into contact with the cover or housing which would alter the fuse blowing characteristics.

Power supply connections can thus be bolted to the bolt 18 and pressed against the terminal connection platform 56 thereby electrically connecting the power supply lines to the battery terminal via the fuse link 54. Certain electrical components such as the airbag, must function at any moment, and are therefore connected directly to the battery post by being clamped around the bolt 16 against the connection platform 62 which has a direct connection to the battery terminal. If the fuse link 54 blows due to a short circuit in the main power supply of the automobile, the safety functions will nevertheless still be connected to the battery.

Figure 17:
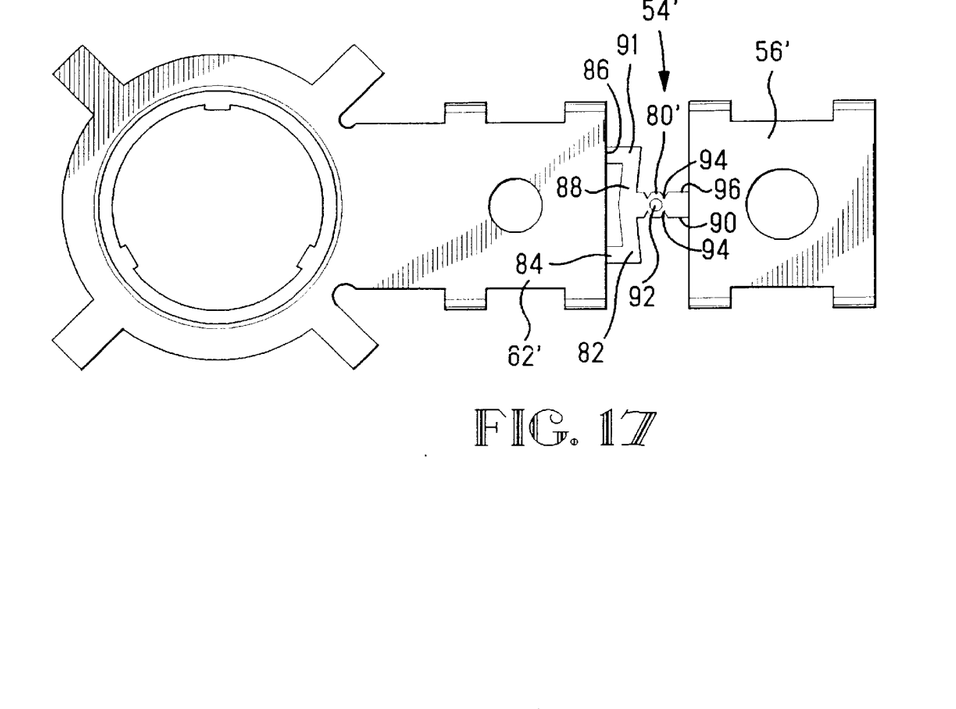
FIGS. 17 and 18 are plan and side views respectively, of another embodiment having a different fuse link design.
Figure 18:
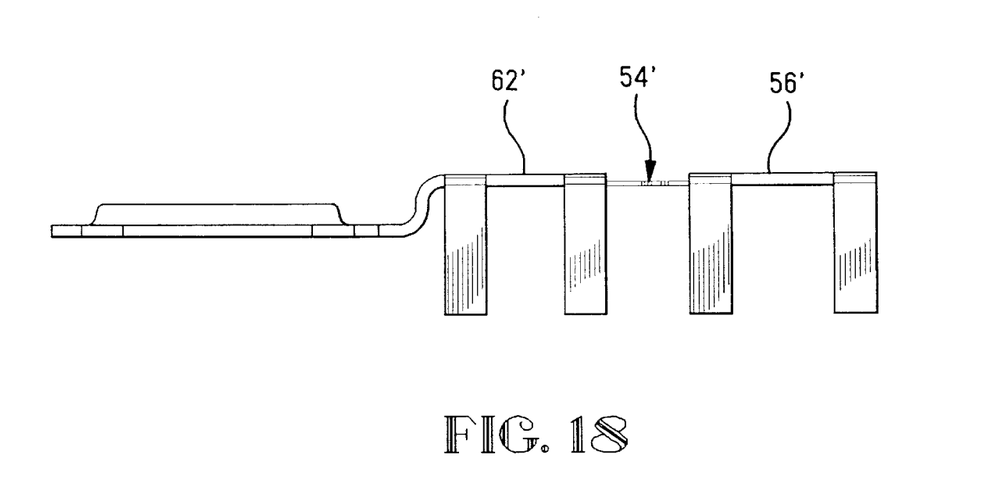

Referring now to FIGS. 17 and 18, another embodiment is illustrated whereby an alternative fuse link 54' having a thin central section 80' that flows when excessive current flows therethrough. The fuse link 54' comprises a U-shaped portion 82 that comprises a pair of spaced apart extensions 84 connected to a connection platform 62' at first ends 86 thereof and connected to a transverse bar 88 extending between other ends 91 thereof. The fuse link 54' further comprises a central bar 90 that extends between a central position on the transverse bar 88 and a terminal connection platform 56' similar to the terminal connection platform 56 of the previous embodiment. The central bar 90 comprises the central portion 80' which has a central hole filled with a tin bead 92, the central portion 80' further comprising indents 94 for thinning the cross-section between the bead and outer edges 96 of the central bar 90. Use of a tin bead is known for example in U.S. Pat. No. 2,055,866, and has the effect of reducing the blowing temperature of the fuse link by producing a different alloy when melting, thus improving the blowing characteristics of the fuse link. The lower blowing temperature also reduces the sagging effect of the fuse link which, if it touches the support member 32, may cool down and not blow at the required electrical current.

The U-shaped element 82 is particularly advantageous in that it provides a sturdy support for the central fuse bar 90 by being supported at two spaced apart points, whilst nevertheless allowing expansion of the central bar 90 due to thermal digitation, in particular because the central bar is connected to a central position on the transverse bar 88 which can thus bend inwards to allow for expansion. Thermal dilatation must be compensated for as the fuse link may otherwise bend excessively and either break prematurely or touch the supports surrounding it, or possibly by other means change the blowing characteristics. The above design, however, provides a sturdy support for the fusing bar 90 whilst nevertheless allowing thermal digitation.

Advantageously therefore, the battery terminal member 6 is integrally connected to the battery post connection portion 68, and the power supply connection sections 50, 52 are strongly and rigidly held to a support member 4 that allows reliable and simple clamping of power supply lines to either end of the fuse link whilst providing a rigid and safe support for the fuse link 54 therebetween.

Figure 19:
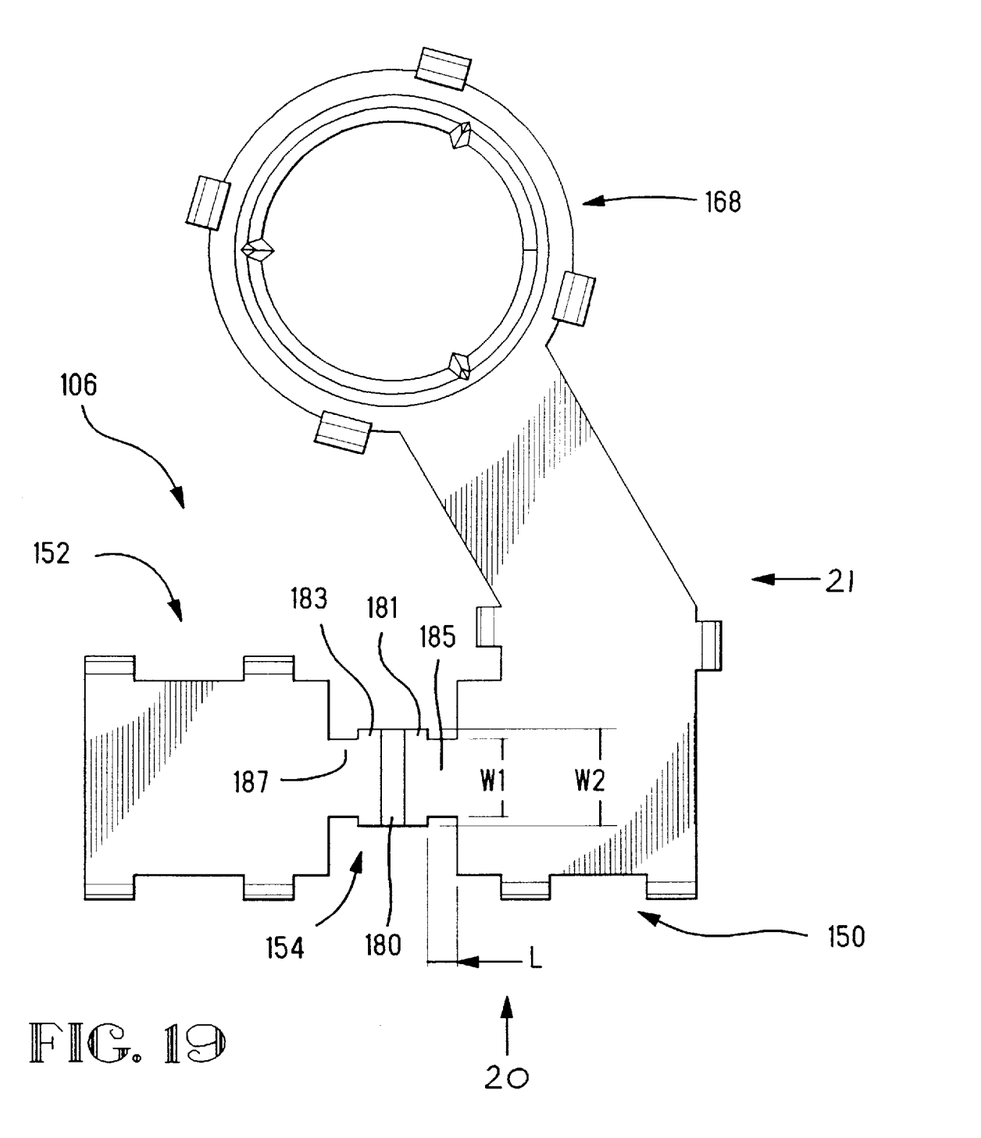
FIG. 19 is a top view of another embodiment of a fuse battery terminal member according to this invention.
Figure 20:
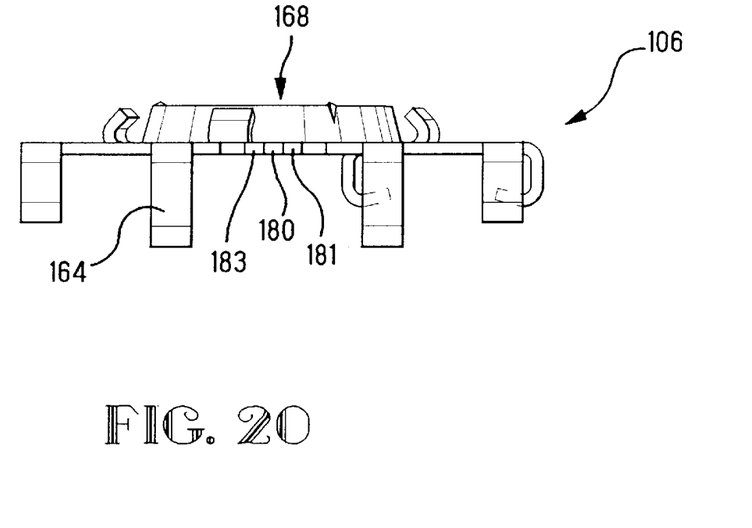
FIG. 20 is a view in the direction 20 of FIG. 19.
Figure 21:
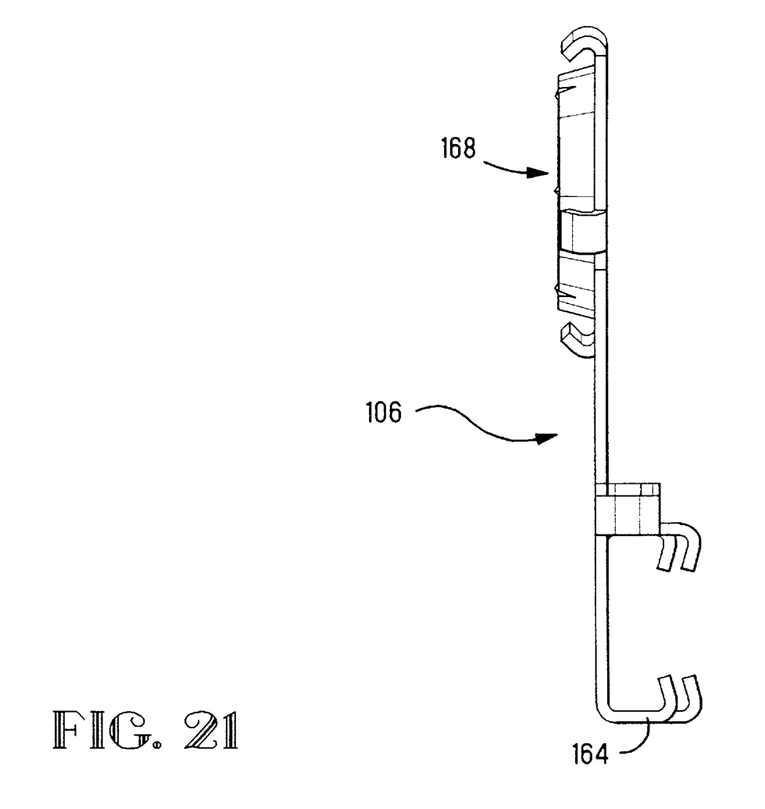
FIG. 21 is a view in the direction of arrow 21 of FIG. 19.
Figure 22:
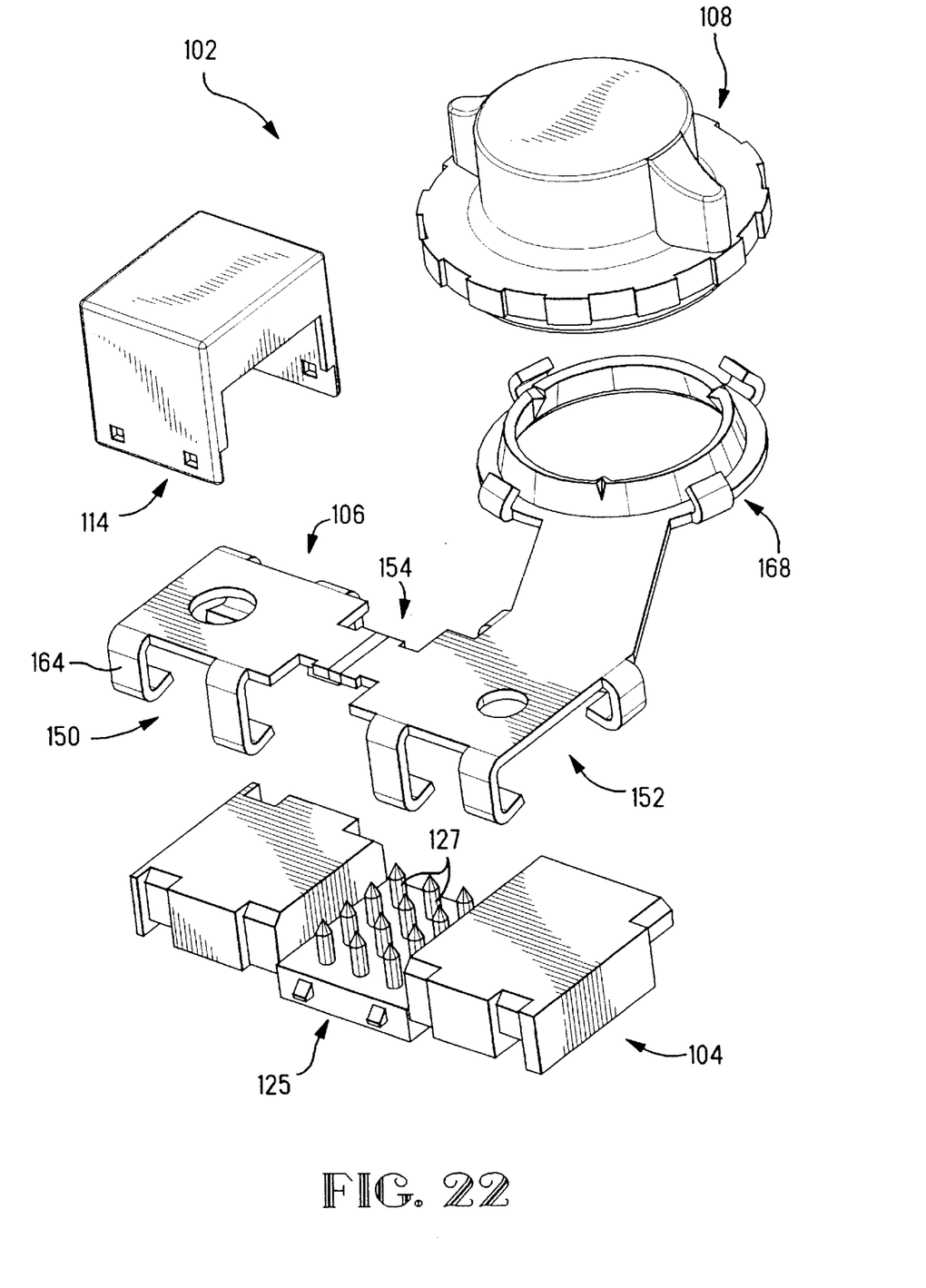
FIG. 22 is an exploded isometric view of a fuse battery terminal incorporating the terminal member according to the embodiment of FIGS. 19–21 but also showing the support housing members.
Figure 23:
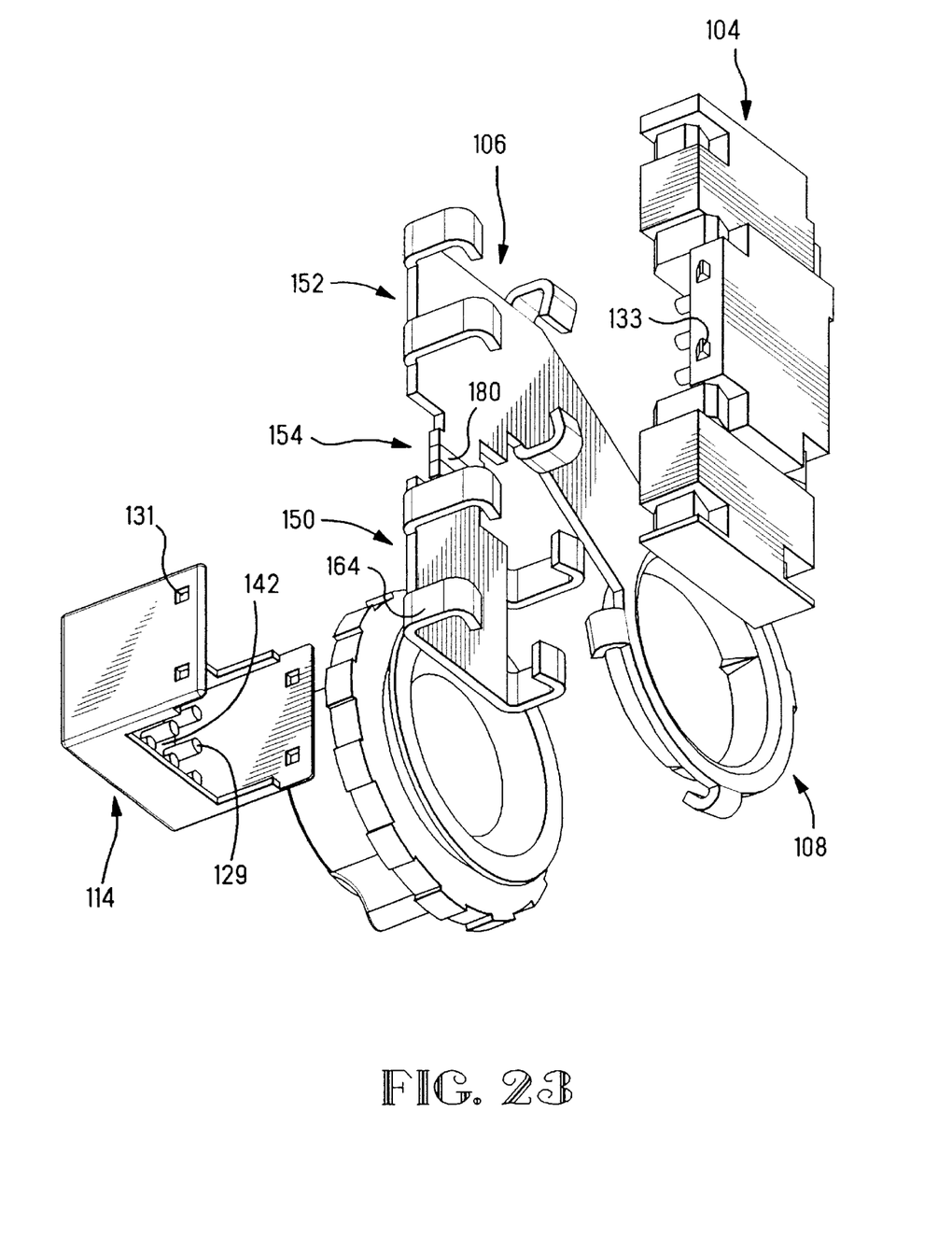
FIG. 23 is another exploded isometric view of the terminal of FIG. 22 but from a bottom side of the terminal.

Referring now to FIGS. 19, 23, another embodiment of a fuse battery terminal 102 is shown comprising a support member 104, a stamped and formed electrical terminal member 106, and battery post mounting members 108. The terminal member 106 comprises a first connection section 150 and a second battery terminal section 152 separated by a fuse-link 154. The first and second sections 150,152 comprise mounting tabs 164 for mounting to the support member 104 in a similar manner to that described in the embodiment of FIGS. 1–18. The fuse battery terminal 102 differs from the fuse terminal 2 principally in the fuse link section 154 of the terminal member 106 and in the fuse section 125 of the support member 104 as will be described hereinafter. The battery post connection section 168 in the embodiments of FIG. 22 also differs in that it is attached to a lateral extension extending from the terminal section 152. The position of the battery post connection section 168,68 will depend on the particular geometrical requirements of the particular application.

The terminal fuse-link section 154 will now be described in more detail. The fuse-link section 154 comprises a fuse portion 180 which is a bar of fusible material, the material being of tin or tin alloy for example, interlinking support bars 181,183. The fuse portion 180 can be attached, for example, by reflow of the tin between the support bars. The support portions 181,183 had a width W2 and are integrally linked to respective base sections 150,152 via reduced width transition portions 185,187 respectively. The fusible material bar 180 has a lower melting point than the base sections and support portion material which could be, for example, brass. The reduced width transition portions 185,187 have a certain width W1 and a certain length L that can be varied to adjust the quantity of heat transfer through the transition portions from the fuse-link section. The rate of heat transfer flowing out of the fuse portion 180 will determine the blowing characteristics thereof. Changing the width and length of the transition portions 185,187 can be effectuated by simple changes to the stamping die from which the terminal member is stamped, thus making it easy to change the characteristics if required, as well as providing easily measurable parameters that can be directly measured and linked to their corresponding test curves, thus making it easy to control the design of the fuse and any modifications required by changes in the specifications. During excessive currents over specified time, the bar of fusible material 180 melts and falls off (or is blown off) the support bars 181,183 by gravitational force (or vaporization). If the fusible material does not fall off by gravitation, it will vaporize and blow off the support members because molten tin has an electrical resistance about three times greater than when in the solid state, so it will heat up very rapidly once in the molten state.

The fuse-link 154 does not provide an integral interconnection between the support members 181,183, rather the fusible bar of material 180 spans fully across the whole length of the support bar such that no connection between the support bars subsists once the molten tin has fallen off. The blowing characteristics of the fuse-link is more reliable in this way as integral links between the support members may not blow sufficiently quickly at very high current peaks.

The housing support member 104 comprises upstanding pins 127 projecting from the fuse section 125 below the fuse-link section 154 of the terminal member 106 when mounted to the support member. A cover member 114 that is mountable over the fuse-link 154 and securely fixable to the support member 104, also comprises pins 129 projecting from a top wall 142 of the cover 114 towards the terminal member fuse-link section 154. The pins 127,129 serve to capture the molten fusible material when it drops off the support bars 181,183 to prevent the fusible material from flowing and accidentally reconnecting the first and second sections 150,152 of the terminal member. In this embodiment, the cover 114 is securely attached to the support member 104 by interengaging latching means 131, 133 which allows quick assembly thereof.

Advantageously therefore, the provision of support bars integrally interconnected to respective sections of the terminal via reduced width portions, and provided with a fusible material with low melting point temperature spanning across the whole width of the support members provides a very high temperature fuse with finely adjustable blowing characteristics. Furthermore, there is no risk of sagging or other such problems related to fuses where the support bars are integrally interlinked.

We claim:

1. An automobile battery connector comprising a battery post mounting member for connection to a battery post, and a power supply connection member for connection to power supply conductors of an automobile, the connector characterized in that the power supply connection member comprises an insulative support member and a terminal member rigidly fixed thereto, the terminal member comprising a fuse link extending between a power supply connection section and a battery terminal section, the battery terminal section having a portion for mechanical and electrical connection of the mounting member thereto.

2. The connector of claim 1 characterized in that power supply connection section comprises a connection platform against which power supply conductors of an automobile can be clamped for electrical connection thereto.

3. The connector of claim 2 characterized in that the battery terminal section comprises a connection platform against which conductors for safety functions of an automobile can be clamped for electrical connection thereto.

4. The connector of claim 2 characterized in that deformable tabs extend from the connection platforms for rigid fixing thereof to the support member.

5. The connector of claim 4 characterized in that the support member comprises an insulative housing having an upper surface upon which the terminal connection platforms are mounted, an opposing bottom surface and opposing sides extending therebetween, whereby the deformable tabs are wrapped around the sides and bottom surfaces.

6. The connector of claim 4 characterized in that the support member comprises retention walls extending out from the side surfaces for strongly guiding and retaining the connection platforms to the support member.

7. The connector of any of claims 1–6 characterized in that the fuse-link comprises a fuse portion that melts or blows when subject to excessive electrical currents for specified times, wherein the fuse-link comprises a pair of spaced-apart support bars each integrally attached via transition portions respectively to a connection section and a battery terminal section, the fuse portion being supported by and extending between the pair of support bars.

8. The connector of claim 7 characterized in that the transition portions have a defined width and length for adjusting the amount of heat transfer from the support bars respectively to the connection and battery terminal sections, where the width is measured in a direction substantially along the support bars and the length is measured in a direction to and away from the support bars, the widths of the transition portions being less than a width of the support bars.

9. The connector of claim 7 characterized in that the insulative support member has a fuse portion opposite and spaced-apart from the terminal fuse-link, the housing fuse portion comprising upstanding pins projecting towards the fuse-link for capturing molten fusible material of the fuse-link.

10. The connector of claim 9 characterized in that a cover positioned over an opposite side of the fuse-link with respect to the housing fuse portion for covering the fuse-link, also has pins projecting towards the fuse-link for capturing molten fusible material.

11. The connector of claim 1 characterized in that the support member comprises power supply connection section, a battery section, and a fuse section extending therebetween, the connection and battery sections having an upper surface from which an upper surface of the fuse section is recessed.

12. The connector of claim 11 characterized in that the power supply connection section comprises a bolt inmoulded thereto for clamping of conductors to the power supply platform.

13. The connector of claim 11 characterized in that the support member battery section comprises a bolt inmolded thereto for clamping of safety function conductors to the battery connection platform.

14. The connector of claim 1 characterized in that an insulative cover is provided for secure mounting to the fuse section of the support member to protect the fuse link from damage or deposits of dirt.

15. The connector of any preceding claim characterized in that the fuse link comprises a U-shaped portion having spaced apart leg portions attached to one of the connection sections between which extends a transverse bar, and a central bar having a blowable central fuse portion, the central bar extending between a central position of the transverse bar and one of the connection sections such that thermal dilatation and contraction of the central bar is absorbed substantially by bending of the transverse bar.

16. A fuse link for high current applications, the fuse link comprising a fuse portion that blows when subject to excessive electrical current, the fuse portion forming part of an axially extending central bar attached at one end to a connection section for electrical attachment to a conductor, and extending towards a second connection section for electrical attachment to another conductor, characterized in that the fuse link further comprises a U-shaped section comprising spaced apart legs attached to the second connection section at first ends, and attached to a transverse bar extending between other ends, the central bar being attached to a central position of the transverse bar such that thermal expansion and contraction of the central bar is substantially absorbed by bending of the transverse bar.

17. A fuse-link for high current applications, the fuse link comprising a fuse portion that melts or blows when subject to excessive electrical currents for specified minimum times, characterized in that the fuse-link comprises a pair of spaced-apart support bars each integrally attached via transition portions respectively to a connection section and a battery terminal section, the fuse portion being supported by and extending between the pair of support bars wherein the fuse portion is comprised of a fusible material having a lower melting point than the support bar.

18. The fuse-link of claim 17 characterized in that the transition portions have a defined width and length for adjusting the amount of heat transfer from the support bars respectively to the connection and battery terminal sections, where the width is measured in a direction substantially along the support bars and the length is measured in a direction to and away from the support bars, the widths of the transition portions being less than a width of the support bars.

19. The fuse-link of claim 18 characterized in that the support bars are of substantially the same width as the fuse portion.

20. The fuse-link of claim 18 characterized in that the support bars are spaced-apart at a substantially constant spacing over their widths.

21. The connector of claim 17 wherein the fuse portion material is a tin alloy.

22. An automobile battery connector comprising a battery post mounting member for connection to a battery post, and a power supply connection member for connection to power supply conductors of an automobile, the connector characterized in that the power supply connection member comprises an insulative support member and a terminal member rigidly fixed thereto, the terminal member comprising a fuse link extending between a power supply connection section and a battery terminal section, the battery terminal section having a portion for mechanical and electrical connection of the mounting member thereto, and wherein the fuse link comprises a fuse portion that melts or blows when subject to excessive electrical currents for specified minimum times, the fuse link comprising a pair of spaced-apart support bars each integrally attached via transition portions respectively to the connection section and the battery terminal section, the fuse portion being supported by and extending between the pair of support bars.

23. The connector of claim 22 wherein the support bars are of substantially the same width as the fuse portion.

* * * * *